United States Patent [19]

Elms et al.

[11] 4,247,879
[45] Jan. 27, 1981

[54] PEOPLE PROTECTING GROUND FAULT CIRCUIT BREAKER UTILIZING WAVEFORM CHARACTERISTICS

[75] Inventors: Robert T. Elms; Joseph C. Engel, both of Monroeville, Pa.

[73] Assignee: Westinghouse Electric Corp., Pittsburgh, Pa.

[21] Appl. No.: 897,885

[22] Filed: Apr. 19, 1978

[51] Int. Cl.³ .......................... H02H 3/33; H02H 3/44
[52] U.S. Cl. ........................................ 361/45; 361/86; 361/87
[58] Field of Search .................. 361/44, 45, 46, 42, 361/87, 86; 128/2.1 P, 2.1 Z; 328/114, 139, 149, 167, 165; 307/354

[56] References Cited

U.S. PATENT DOCUMENTS

| | | | |
|---|---|---|---|
| 3,515,943 | 6/1970 | Warrington | 361/113 |
| 3,706,008 | 12/1972 | Kremer | 128/2.1 P X |
| 3,787,709 | 1/1974 | Coe | 361/45 |
| 3,852,642 | 12/1974 | Engel et al. | 361/45 |
| 3,891,895 | 6/1975 | Wittlinger | 361/45 |
| 3,953,767 | 4/1976 | Ahmed | 361/44 |

FOREIGN PATENT DOCUMENTS 349946 11/1929 United Kingdom .
1448934 9/1976 United Kingdom .

Primary Examiner—Patrick R. Salce
Attorney, Agent, or Firm—Robert E. Converse, Jr.

[57] ABSTRACT

A ground fault circuit breaker is provided which includes means for sensing ground fault current and for analyzing the waveform of the ground fault current. An operating mechanism automatically separates the contacts of the circuit breaker upon detection of ground fault current waveforms corresponding to the waveform of current passing through human skin. In a preferred embodiment, means are provided to synchronously detect the third harmonic component of ground fault current using phase and amplitude information to determine the presence of a ground fault path through human skin. Alternatively, means are provided to sense peak and average values of ground fault current and to trip the breaker whenever the ratio of peak to average ground fault current exceeds a predetermined level. In another alternative, the slope of the ground fault current at zero crossing is detected and compared to the ground fault current peaks. Whenever the ratio of peak current to zero crossing slope exceeds a predetermined level, the mechanism of the breaker is tripped.

2 Claims, 2 Drawing Figures

PEOPLE PROTECTING GROUND FAULT CIRCUIT BREAKER UTILIZING WAVEFORM CHARACTERISTICS

BACKGROUND OF THE INVENTION

1. Field of the Invention

The invention relates generally to ground fault circuit interrupters and, more particularly, to ground fault circuit interrupters capable of detecting low levels of ground fault current through a human being in the presence of large standing leakages currents.

2. Description of the Prior Art

Circuit interrupters are widely used in industrial, commercial, and residential environments to protect circuit conductors against damage due to overcurrent conditions. Such circuit interrupters are normally designed to open, or trip, whenever current flow through the interrupter reaches a level which may cause damage to circuit components due to resistance heating of the conductors. However, damage can also occur at levels significantly lower than the overcurrent trip level if a path is established from a line conductor to ground. Therefore, ground fault circuit interrupters are provided to detect such ground fault current flow and trip at levels significantly below the overcurrent trip level.

Even greater sensitivity is required in order to provide protection to human beings who accidently establish a fault current path from a live conductor to ground. The value of 5 milliamperes has been generally accepted as the desirable level for ground fault circuit interrupters to trip in order to provide people protection. A ground fault circuit interrupter having a trip level of 5 milliamperes is generally satisfactory in a residential environment or in other applications having a low standing leakage current. However, many industrial installations which employ large amounts of electrical machinery have leakage currents much greater than 5 milliamperes. A standard people-protecting ground fault circuit interrupter is thus not applicable under such conditions. It would be desirable to provide a ground fault circuit interrupter capable of withstanding large standing leakage currents caused by ground fault paths through electrical apparatus but which will trip upon establishment of a ground fault path through a human being.

SUMMARY OF THE INVENTION

In accordance with a preferred embodiment of the present invention, there is provided a people protecting ground fault circuit interrupter including separable contacts and a mechanism operable upon actuation to automatically open the contacts. Means are provided for sensing ground fault current through the contacts and for analyzing the waveform of the ground fault current. The analyzing means operates the mechanism upon detection of a ground fault current waveform corresponding to the waveform of current passing through human skin. Operation of the mechanism thus separates the contacts and trips the circuit interrupter.

In one embodiment, the waveform analyzing means includes means for synchronously detecting third harmonic components of the current waveform to produce phase and amplitude information. The ratio of the third harmonic component to the fundamental component is calculated and when the ratio exceeds a predetermined value, the mechanism is tripped.

In an alternative embodiment, the waveform analyzing means includes means responsive to the peak ground fault current and to the average ground fault current. When the ratio of peak to average ground fault current exceeds a predetermined value, the mechanism is tripped.

In a third embodiment, the waveform analyzing means includes means responsive to the slope of the current waveform at zero crossing and to peak ground fault current. When the ratio of peak ground fault current to slope at zero crossing exceeds a predetermined value, the mechanism is tripped.

DESCRIPTION OF THE PREFERRED EMBODIMENT

Figure 1:
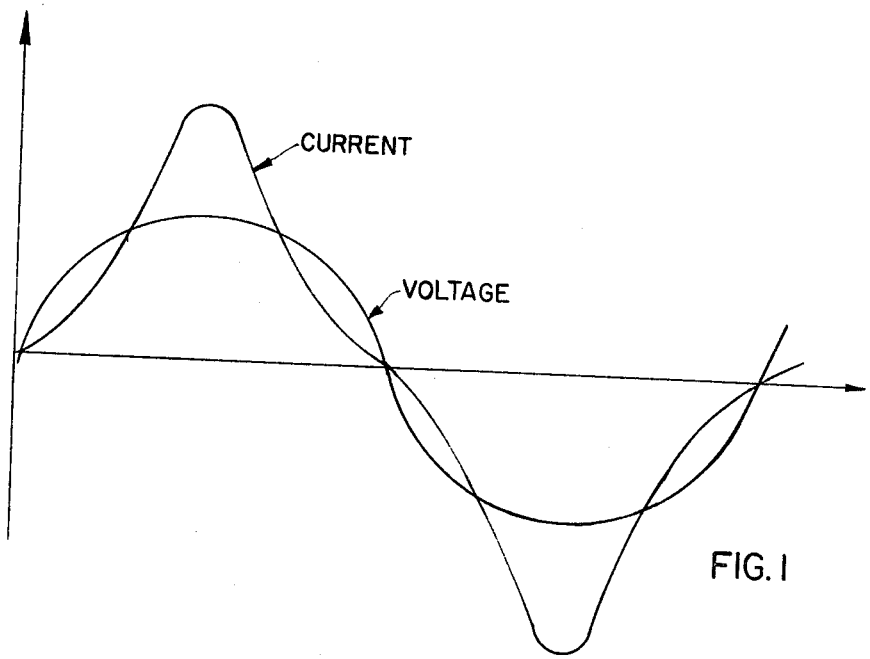
FIG. 1 shows the waveforms of current and voltage through human skin.

FIG. 1 shows the waveforms of voltage and current passing through human skin. It will be noted that the current is extremely non-linear. In particular, it can be seen that the current waveform is peaked, with the peak occurring near the peak of line voltage. This differs considerably from the current waveform through normal ground impedances which range from resistive to capacitive, but are normally linear.

In the present invention, the waveform of ground fault current is analyzed to determine the presence of ground fault current flowing through human skin. A waveform differing from a standard sine wave in the manner of the human ground fault current waveform of FIG. 1 is produced by a significant third harmonic component of the current. Therefore, in one embodiment of the present invention, means are provided to sense the presence of third harmonic components and compute the ratio of these components to the fundamental. Means are further provided to compare this ratio with a predetermined limit and trip upon exceeding this limit.

Figure 2:
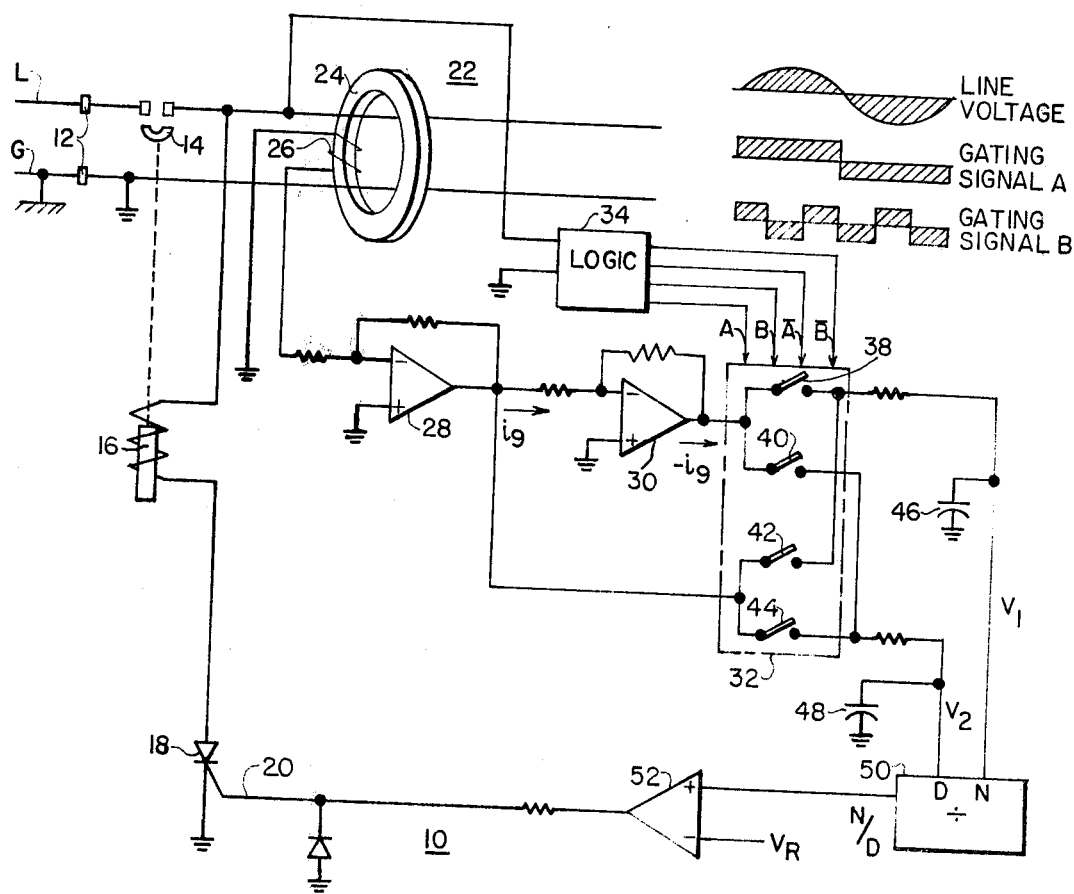
FIG. 2 is an electrical schematic diagram of a people-protecting ground fault circuit interrupter which analyzes the waveform of ground fault current to calculate the ratio of third harmonic content to fundamental content and trip the breaker when the ratio exceeds a predetermined value.

A people-protecting ground fault circuit breaker 10 employing third harmonic waveform analysis is shown schematically in FIG. 2. A line conductor L and ground conductor G enter the circuit breaker 10 at terminals 12. Separable contacts 14 can be automatically opened by a trip coil 16 connected in series with the line conductor L, a silicon controlled rectifier 18, and ground. The presence of a trip signal upon the gate 20 of the silicon controlled rectifier 18 is operable to energize the coil 16 and cause an automatic separation of the contacts 14 to trip the breaker 10.

A current transformer 22 comprising a core 24 and sensing winding 26 encircles the line and ground conductors. In a well known manner, ground fault current flowing from the line conductor L downstream from the current transformer 22 will cause a current proportional to such ground fault current to flow in the sensing winding 26. The ground fault current signal from the sensing winding 26 is amplified by an operational amplifier 28 to produce the current signal $i_g$. An inverting operational amplifier 30 produces an inverse signal $-i_g$. These signals are synchronously detected by a quad bilateral switch represented schematically at 32, which is controlled by gating signals A and B, produced by digital logic represented at 34.

The logic 34 utilizes the line voltage waveform obtained from a lead 36 connected to the line conductor L to produce the gating signals A and B having the form shown in FIG. 2. As can be seen, gating signal A is a square wave, having a frequency equal to the line voltage frequency. Gating signal B is a square wave having a frequency equal to three times the line frequency. These gating signals and their inverses are then applied to the respective detector switches 38, 40, 42, 44, as shown in FIG. 2. The inverse of gating signal A controls switch 38. Switch 40 is controlled by gating signal B. Switch 42 is controlled by gating signal A, and switch 44 is controlled by the inverse of gating signal B. The device 32 is available in commercial quantities from the RCA Company as the type CD4016. When a logical HI signal is applied to one of the control terminals, the corresponding output terminal is connected by a low impedance path to the corresponding input terminal. Functionally, for example, the "switch" 40 would be "opened" and "closed" at a rate of three times the line frequency due to the action of gating signal B. The "switch" 44 would be "opened" and "closed" at the same rate but with a phase opposite to that of 40, since 44 is controlled by the inverse of gating signal B.

The outputs of the quad bilateral switch 32 produce a pair of signals which, after passing through resistor-capacitor networks 46 and 48, produce signals $V_1$ and $V_2$ proportional to the fundamental component of the ground fault current and the third harmonic component of the ground fault current, respectively. Logic signals A and B are in phase with the line voltage. Therefore, synchronously rectified signals $V_1$ and $V_2$ represent the value of the "in-phase" fundamental and third harmonic components of the ground current. This is important as the current through a person is also "in-phase" with the applied line voltage (see FIG. 1). That is, the current and voltage zero crossing and peak values occur at the same time. Out of phase components are not "people" ground currents and thus should be ignored. Signals $V_1$ and $V_2$ are then combined in the divider 50 to produce the ratio $V_1/V_2$, corresponding to the ratio of third harmonic ground fault current to fundamental ground fault current. This ratio signal is then applied to a comparator 52, the inverting terminal of which is supplied by a voltage reference $V_R$. The voltage reference is established to correspond to the degree of third harmonic distortion caused by 5 milliamperes of ground fault current through human skin.

When the ratio $V_2/V_1$ exceeds the $V_R$ reference, the comparator 52 produces a trip signal upon the gate electrode 20 of the silicon controlled rectifier 18. The trip coil 16 is thus energized to automatically separate the contacts 14 and trip the circuit breaker 10.

Alternatively, the device of FIG. 2 could be modified as in FIG. 3 to provide means 60 and 62 which are responsive to the peak ground fault current and to the average ground fault current, respectively. As can be seen in FIG. 1, ground fault current flowing through human skin will have a higher ratio of peak current to average current than current flow through normal ground impedances. Thus, by comparing the ratio of peak to average ground fault current with a reference ratio corresponding to 5 milliamperes of human ground fault current, a trip signal could be produced at the desired 5 milliampere level.

In yet another alternative shown in FIG. 4, the waveform analyzing means include means 64 for measuring the slope of the current waveform at zero crossing. Means 60 are also provided to produce a signal corresponding to peak ground fault current. The ratio of peak current to slope of the current waveform at zero crossing then be computed by the divider 50 and compared to a reference value corresponding to a similar ratio produced by 5 milliamperes of human ground fault current. When the detected ratio exceeds the reference value, a trip signal is produced in a manner similar to the first described embodiment.

The various means called for in the described alternate embodiments could be implemented in a variety of ways, as can be readily appreciated by those skilled in the art of electronic circuitry. Thus, these means are not described in detail.

It can be seen, therefore, that the present invention provides a people protecting ground fault circuit breaker which is capable of detecting 5 milliamperes of human ground fault current in the presence of large standing leakage currents. Such a circuit breaker is of great value in applications having such large standing leakage currents.

We claim:

1. People-protecting ground fault circuit breaker apparatus, comprising:
   separable contacts;
   means operable upon actuation to automatically separate said contacts to trip said apparatus;
   means for sensing ground fault current through said contacts; and,
   means for analyzing the shape of the waveform of said ground fault current comprising means responsive to peak ground fault current and average ground fault current, and means for comparing the ratio of peak-to-average ground fault current to a predetermined reference value corresponding to a peak-to-average ratio produced by human ground fault current of a specified tripping level, said analyzing means actuating said separating means whenever the detected ratio of peak-to-average ground fault current exceeds said predetermined reference value.

2. People-protecting ground fault circuit breaker apparatus, comprising:
   separable contacts;
   means operable upon actuation to automatically separate said contacts to trip said apparatus;
   means for sensing ground fault current through said contacts; and,
   means for analyzing the shape of the waveform of said ground fault current, said analyzing means comprising means responsive to peak ground fault current and means responsive to the slope of the waveform of said ground fault current at zero crossing, said waveform analyzing means also comprising means for computing the ratio of said peak ground fault current to said slope and for comparing said ratio to a reference value corresponding to a peak-to-slope ratio produced by human ground fault current of a specified tripping level, said analyzing means operating said contact separating means upon detection of a value of said ratio greater than said reference.

* * * * *